United States Patent [19]

Agostinelli et al.

[11] Patent Number: 4,822,148
[45] Date of Patent: Apr. 18, 1989

[54] MULTICOLOR LIGHT VALVE IMAGING APPARATUS HAVING ELECTRODE CONSTRUCTIONS FOR UNIFORM TRANSMISSION

[75] Inventors: John A. Agostinelli, Rochester; José M. Mir, Webster, both of N.Y.

[73] Assignee: Eastman Kodak Company, Rochester, N.Y.

[21] Appl. No.: 100,058

[22] Filed: Sep. 23, 1987

[51] Int. Cl.[4] .......................... G02F 1/03; G02F 1/01
[52] U.S. Cl. .................................. 350/356; 350/392; 350/393
[58] Field of Search ................ 350/355, 356, 392, 393

[56] References Cited

U.S. PATENT DOCUMENTS

| | | | |
|---|---|---|---|
| 4,366,500 | 12/1982 | Kurtz et al. | 358/75 |
| 4,371,892 | 2/1983 | Mir | 358/75 |
| 4,378,568 | 3/1983 | Mir | 358/75 |
| 4,406,521 | 9/1983 | Mir et al. | 350/393 |
| 4,449,153 | 5/1984 | Tschang | 358/296 |
| 4,569,573 | 2/1986 | Agostinelli | 350/320 |

Primary Examiner—Eugene R. LaRoche
Assistant Examiner—Nathan W. McCutcheon
Attorney, Agent, or Firm—John D. Husser

[57] ABSTRACT

A light modulator device for use in a light valve imaging system to image print media with different light colors comprising a panel of electro-optic material of the type which changes the polarization of transmitted light selectively upon application of an electric field and a plurality of electrode pairs, linearly spaced along the panel to define an array of modulator gap portions between respective electrode pairs. The modulator gap portions associated with different color filters have a different dimension selected respectively to effect maximum light transmission for different light colors under address by approximately the same voltage.

6 Claims, 4 Drawing Sheets

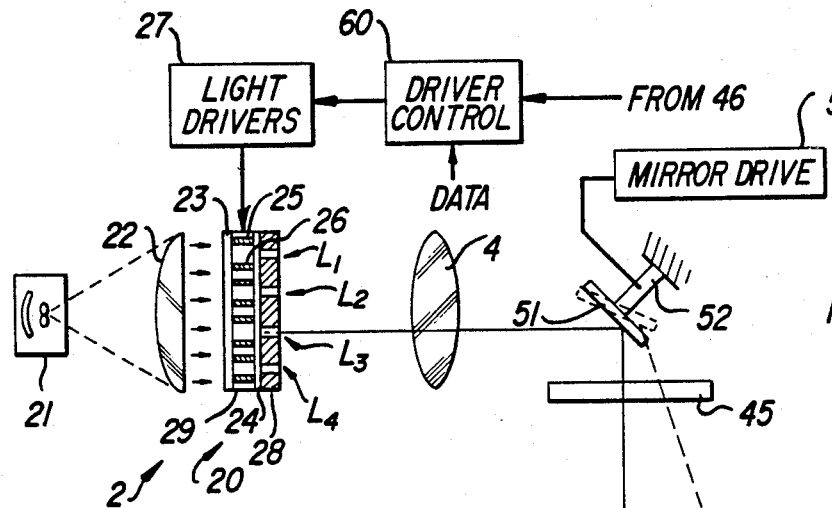
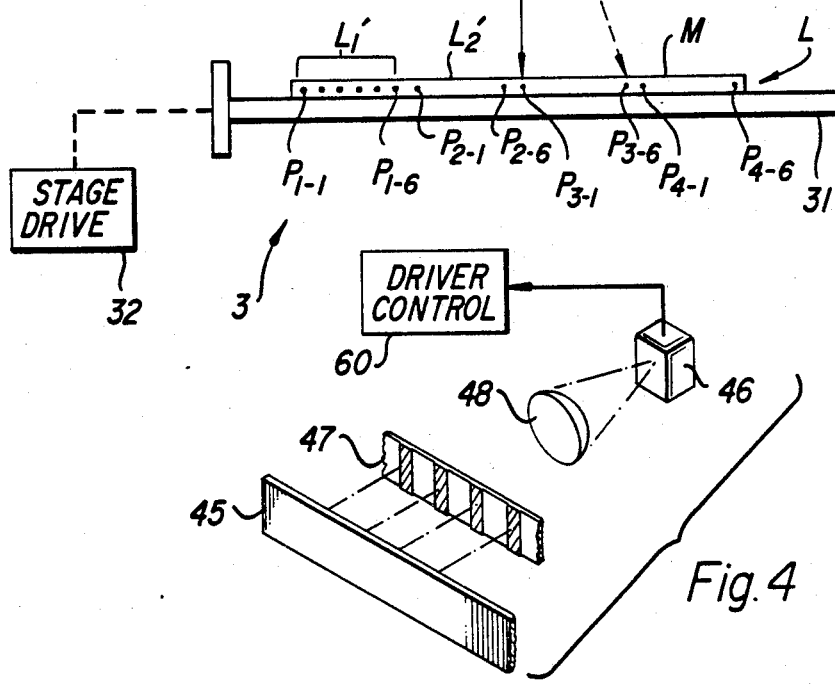

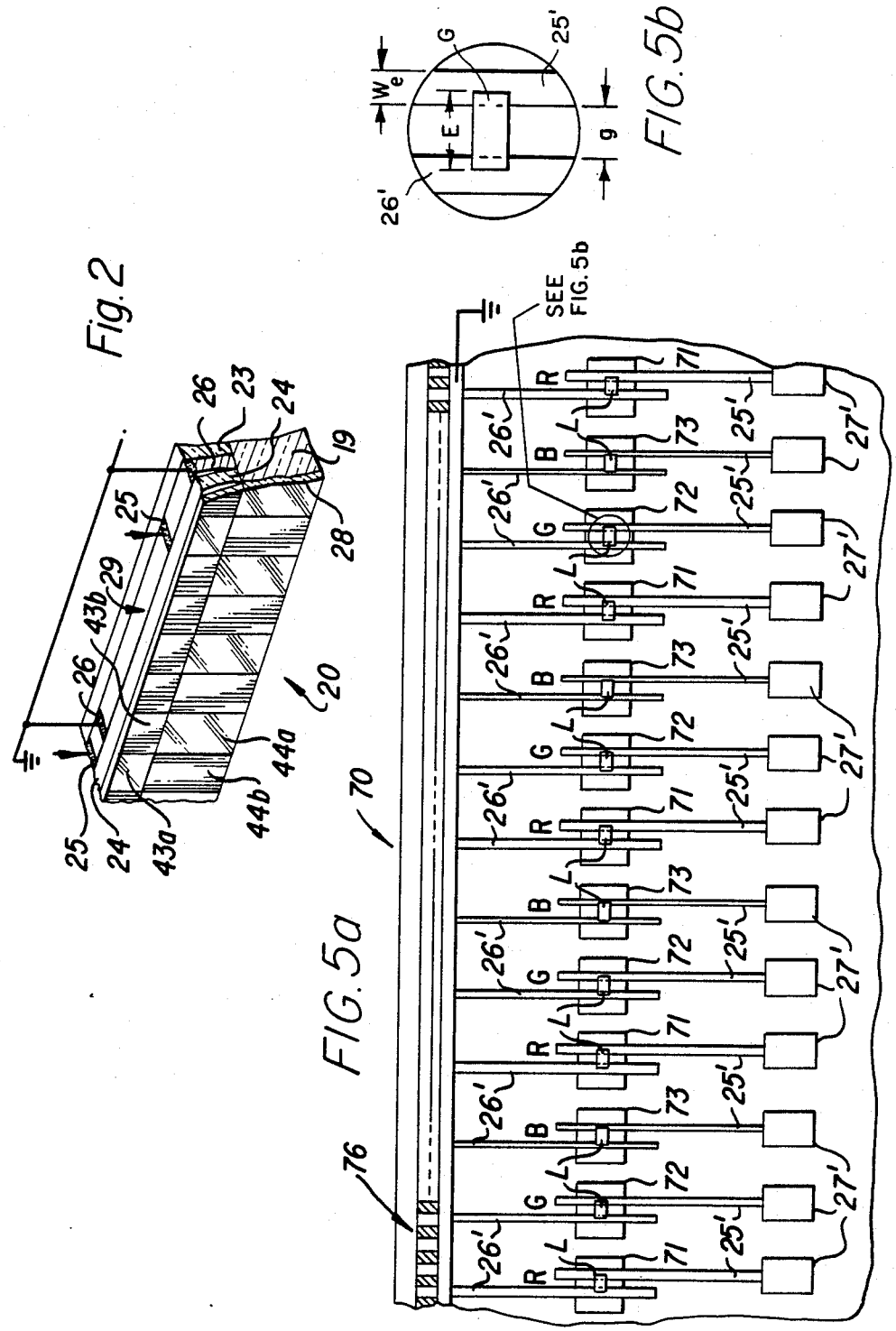

MULTICOLOR LIGHT VALVE IMAGING APPARATUS HAVING ELECTRODE CONSTRUCTIONS FOR UNIFORM TRANSMISSION

FIELD OF THE INVENTION

The present invention relates to light valve apparatus for printing multicolor images and more particularly to electro-optic modulator constructions in such apparatus that yield substantially uniform transmission for different colors of light when a common activating voltage level is utilized.

BACKGROUND OF THE INVENTION

U.S. patent application Ser. No. 099,953, entitled "System for High Resolution Exposure Address With Coarser Resolution Exposing Array", filed Sept. 23, 1987, by Agnostinelli and Mir, describes advantageous imaging devices wherein an object source array (e.g. comprising a linear array of light valve elements) of relatively coarse resolution is imaged at a print zone in a manner providing a relatively higher resolution exposure. In one preferred embodiment, this approach utilizes (i) an object array having exposing pixels of width (w) located with intervening non-exposing spaces so as to have a center-to-center spacing S and (ii) a scan multiplexing optical system, e.g. including lens means and a mirror, which indexes the image of the exposing array in a number of increments, approximately $S \div W$, to successive positions across a linear print zone. This system offers important advantages in simplifying array fabrication and in reducing electronic complexities.

One preferred embodiment of the above-described application provides different color filter elements (e.g., red, green and blue filters) repeating series over the exposing pixels sources. Because each pixel source exposes a band at the image zone, it is particularly important that the transmission of the common color sources be equal. Otherwise the boundary between the scan of two adjacent same-color source is visually discernible.

As described in U.S. Pat. No. 4,371,892, the transmission of a crossed-polarizer/PLZT sandwich light valve device with respect to a particular wavelength (color) light is most uniform when operating at the voltage of maximum transmission for that wavelength, which voltage has been termed the $\lambda/2$ or half-wave voltage. However, different light colors have different half-wave voltages in regard to their transmission through identical light gates of such arrays. To attain uniformity for multicolor printing with such arrays, the '892 patent teaches the application of different voltages, e.g. in a time-multiplexed fashion, for different light color printing actuations. Howver, in the approach of the above-cited application there is no requirement for time-multiplexing the activations of different color exposures. Moreover, it is most convenient to drive adjacent modulators from the same electronic chip having integrated high-voltage drivers providing a single voltage level. Thus the approaches described in the '892 patent have disadvantages when applied to systems such as described in the above-cited application.

SUMMARY OF THE INVENTION

A significant purpose of the present invention is to overcome the above-noted disadvantages and in one aspect this is accomplished by providing a light valve modulator design such that the half-wave voltage is constant for all of the different light colors that it controls. In preferred embodiments of the invention this is accomplished by varying the gap between address and reference electrodes for the different color filter groups that comprise the multicolor linear light valve array.

In one constitution the invention provides improvements for multicolor light valve imaging apparatus of the type including (i) an isotropic-birefringent modulator panel with sandwiching polarizer and analyzer elements, (ii) electrode means dividing the panel into a plurality of selectively addressable pixel portions, (iii) a plurality of different color filter elements arranged in light filtering association with respective pixel portions, (iv) light source means for directing multicolor light through the modulator and polarizer, analyzer and filter elements and (v) means for addressing the electrodes to selectively apply voltage across the pixel portions. Such improvements involve (a) the electrode-defined pixel portions having different constructions for the different color filter element associations such that the half-wave voltage for each pixel portion and filter combination is substantially equal and (b) the addressing means being constructed to apply such substantially equal half-wave voltage across all pixel portions of the panel. In one preferred constitution of the invention, the modulator electrode structure is varied by providing different spacings between reference and address electrodes, respectively for each different color group.

BRIEF DESCRIPTION OF THE DRAWINGS

The subsequent description of preferred embodiments refers to the attached drawings wherein:

FIGS. 1–4 are schematic views showing the multiplexing approach of the above-referenced application;

FIGS. 5a and 5b are schematic plan views of a light valve array element constructed for multiplexed multicolor exposures in accord with the present invention;

DETAILED DESCRIPTION OF THE PREFERRED EMBODIMENTS

Figure 6:
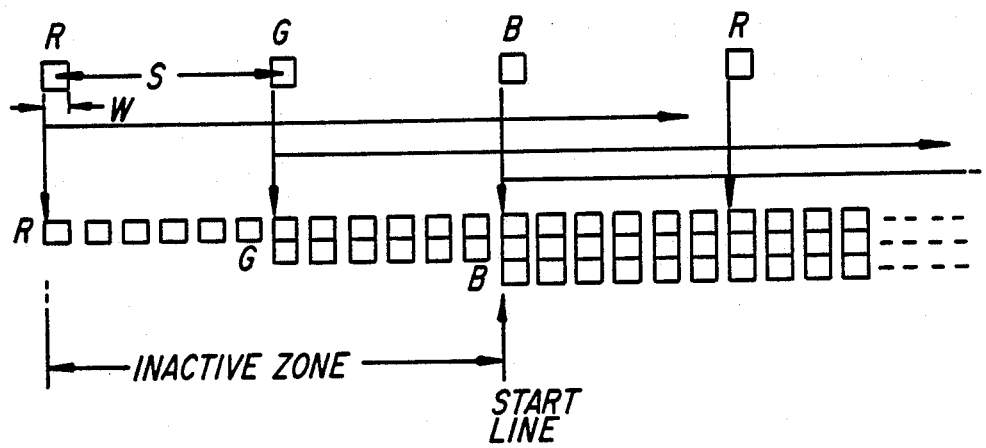
FIG. 6 is a diagram illustrating the operation of the FIG. 5 embodiment of the invention.

The exposing system shown in FIG. 1 is a multiplexing printer such as described in the above-mentioned Agostinelli et al application and, in general, comprises an object array sub-system 2 providing a plurality of selectively activatible exposure elements, a print station 3 constructed and located to transport successive line portions of print medium M to and through a print zone L, lens means (represented by lens 4) that is constructed and located to form an image of the object array 2 at the print zone (at a selected magnification F, e.g. 1:1, 2:1, 1:2, etc.) and a scan sub-system 5 that is constructed and located to index the light image of object array sub-system 2 to different locations at the print zone L.

The object array sub-system 2 includes a light source 21 providing uniform illumination to a collimator lens 22, which in turn directs collimated light onto the ingress polarizer element 23 of light valve array 20. The light valve array 20, shown in more detail in FIG. 2, also comprises an electro-optic panel 29, which is sandwiched between ingress polarizer 23 and egress polarizer 25. The panel 29 is formed to have a plurality of discrete exposure portions by construction of spaced electrode structures 25, 26 in a manner which enables selective application of an electrical field in a direction transverse to the direction of light passing through the panel. Such light valve structures are known in the art, e.g. see U.S. Pat. Nos. 4,371,892 and 4,569,573. In general, such arrays function with the directions of the polarizers 23, 24 at 90° relative to each other, and the electro-optic panel 29 (e.g. formed of PLZT material) is adapted to change the polarization direction of passing light by 90° when an activating electric field is applied across the electrodes. Usually one electrode of each pixel portion pair is at a reference electrode 25, e.g. at ground potential, and the other is an address electrode, selectively energizable by driver circuits 27. Thus when the energizable electrode 25 is energized, the field between it and reference electrode 26 will cause the electro-optic material therebetween to change the direction of polarized light from ingress polarizer 23 by 90°; therefore such modulated light will pass through egress polarizer 24. When the address electrode 25 of an array pixel portion is not energized, there will be no change in the polarization of light passing that modulator panel portion and such light will be blocked by the egress polarizer. In the FIGS. 1 and 2 embodiment a mask layer 28 is provided, e.g. formed on egress polarizer 24, and comprises light transparent portions 43a, aligned between electrode pairs, and light opaque portions 43b, interspaced between those transparent portions. In another preferred embodiment (not shown), the mask layer 28 is formed directly on the egress surface of the modulator panel 29, which obviates alignment problems. While the foregoing system employs a mirror 51 mounted on a bimorph bender element 52 to controllably index the light image from the object array 2, other galvo-mirror systems and image scanner systems, e.g., rotating polygon mirrors, can be utilized.

As shown in FIG. 1, the bimorph bender element 52 is controllably driven by mirror drive circuit 53 to move mirror 51 between the solid and dotted line position shown (in successive increments, or in a continuous pass), so as to index the image of the masked face of light valve array at different locations on the line of record medium M (e.g. photosensitive film or paper) then present at the image zone of station 3. As illustrated, the station 3 can comprise a translatory stage 31 driven by stage drive 32 to shift successive line portions of the supported image medium into alignment at print zone L with the line image from lens system 4 and mirror 51. Although the image of light valve array is magnified at the print station 3 in FIG. 1, it will be appreciated that such image can be at unit magnification or less, as the application requires.

Referring now to FIG. 3, as well as FIG. 1, it can be seen that the object source 2 is constructed so that its exposing elements $L_1-L_4$ have a predetermined width (W) in the direction of array length. Also, the individual elements are spaced along the length direction with a predetermined center-to-center spacing (S) and have intermediate opaque sections 43b formed by portions of mask 28.

With a system constructed as described above, the mirror drive circuit 53 and driver control circuit 60 can be coordinated to effect a line exposure in accordance with the present invention. Thus the circuits operate so that exposing source $L_1$ will sequentially address pixel portions $P_{1-1}$ to $P_{1-6}$ at the print zone, source $L_2$ will sequentially address pixel portions $P_{2-1}$ to $P_{2-6}$ at the print zone, source $L_3$ will sequentially address pixel portions $P_{3-1}$ to $P_{3-6}$ at the print zone and source $L_4$ will sequentially address pixel portions $P_{4-1}$ to $P_{4-6}$ at the print zone. This general procedure can be effected in various ways; however, two main features are important. First, the number (M) of sequential exposing actuations to be effected with each light source is selected based on the ratio $(S \div W) \cdot X$ of the exposing element spacing, along the length of the array, to the exposing element width in the direction of the array length, where X is the number of different color exposures per pixel to be effected at the print zone. In the monochrome (X=1) exposing system discussed thus far with respect to FIGS. 1–3, the $S \div W$ ratio is 6, and the discrete locations available for address, e.g. by the source $L_1$, therefore comprise the six pixel portions $P_{1-1}$ to $P_{1-6}$. If desired, the $S \div W$ ratio can differ slightly from the integer number of multiplexed printing sequences performed at the linear image zone. For example, if it is preferred to provide a slight overlap of exposed pixel portions, the $S \div W$ ratio can be somewhat more than the number of multiplexing exposure sequences (M). If a slight spacing is desired between addressed pixel portions, $S \div W$ can be slightly greater than the number of addressed pixel portions. The selection of a preferred $S \div W$ ratio will depend to some extent on the resolution of the optical system. For good results the indexing should be such that the overlap or spacing between pixels as exposed at the print zone not differ by more than about 50% from the condition of edge-to-edge abutment. However, for best imaging quality with a single light color, the pixel portions, e.g. $P_1-P_6$ should be uniformly spaced across the $L_1$ sector of the image zone and the number of discrete pixel portions within a sector should be approximately equal to $S \div W$.

Considering the foregoing it can be seen that a second main functional feature is to predeterminedly synchronize the movement of mirror 51 with the light drivers circuit 27. Thus, it is important that, in each sector $L'_1$, $L'_2$, etc., the addressed pixel portions (e.g. $P_{1-1}$ to $P_{1-6}$) of the sector are uniformly spaced along the sector length. Conceptually the air is to actuate the light sources at increments of image movement at the image zone of about the exposing element width (W) times the system magnification factor (F).

FIGS. 1–4 illustrate one preferred approach for implementing such control in accord with the invention. As best shown in FIGS. 2 and 3, mask 28 also comprises a plurality of alternating opaque and transparent portions 44a and 44b having a spatial frequency equal to $1 \div W$. In order to allow light from source 21 to pass through grating portions 44a, the support 19 adjacent that grating is transparent. If desired, the support could be omitted or the support could be an electro-optic polarizer sandwich with electrodes energized to a light-transmitting condition.

Referring to FIGS. 1 and 4, it can be seen that a mirror 45 is located along the edge of the optical path of the light passing from source 21 through the grating 44a, 44b of mask 28 so as to direct this light to a photodetector 46 via a grating 47 and lens 48. The grating 47 is constructed to have the same spatial frequency as grating 44a, 44b of mask 28, as imaged at the exposure zone L. That is the grating 47 has a spatial frequency of $F \cdot (1 \div W)$ where F is the system magnification. This cooperative grating system produces a high contrast Moiré pattern; and, as the mirror 51 scans, the light transmitted through grating 47 produces a sinusoidal voltage output signal from photodetector. Thus, each voltage maximum (or minimum) of the photodetector signal will correspond to a multiplex event, i.e. a signal for actuating driver control circuit 60 to gate printing information to the light valve drivers. This synchronization technique is highly useful in avoiding nonuniformities caused by flutter in the bimorph driven mirror. While the optical grating position synchronization system just described is advantageous, other position detection systems, e.g. shaft encoders or drive signal counters, can be used to perform the requisite functions of synchronization. In certain embodiments of the FIG. 4 system lens 48 is not needed.

In operation, print data is input to the driver control (which can be a portion of a microprocessor unit) from a buffer memory where it is stored in a format suitable to load the drivers for sources $L_1$ to $L_4$ with print/no-print information for each of their respective sectors of image pixel portions. That is, at the first stage of the line exposure sequence, the gates to the drivers for sources $L_1$ to $L_4$ are loaded in parallel with data respectively for pixel portions $P_{1-1}$, $P_{2-1}$, $P_{3-1}$ and $P_{4-1}$. At the appropriate sequence signal from detector 46 (indicating that mirror 51 is in the position to address those pixel portions), the gates are signalled to operate drivers for sources $L_1$–$L_4$ in accordance with loaded print/no print data and light is directed to the pixel portions accordingly. Thereafter, data for positions $P_{1-2}$, $P_{2-2}$, $P_{3-2}$ and $P_{4-2}$ are loaded into the gates and await the signal from driver control that mirror 51 has moved to the next appropriate pixel address location. This sequence progresses until each sector has all pixel portions address and stage drive then advances the print stage while mirror 51 returns to the initial position. One skilled in the art will appreciate that a multi-level gray scale imaging of pixels can be achieved using techniques such as described in U.S. Pats. Nos. 4,378,568 or 4,449,153 in conjunction with the present invention.

Multicolor imaging can be effected by the system shown in FIGS. 1–4 by repeating the sequence described above with an insertion of a different color filter between successive line or page print sequences. However, referring to FIG. 5, there is shown a more preferred mode of multicolor printing. Thus, the light valve array shown in FIG. 5 comprises a composite polarizer, PLZT, mask unit 70 such as described with respect to FIG. 2; however, there are provided red (R), green (G) and blue (B) filter deposits 71, 72, 73 over each of the light source portions of the array. Such filter elements can be fabricated as described in U.S. Pat. No. 4,366,500 and, as shown, are arranged in successive series R, G, B. The array unit 70 has address and reference electrodes 25' and 26' and drivers 27' such as described above. As shown in the FIG. 6 diagram, the S÷W ratio of the FIG. 5 light valve array is approximately 6, as was the case in the previously described embodiment. The array 70 shown in FIG. 5 has a light and opaque area index control grating 76 with a spatial frequency 1÷W, where W is the width of the green pixels of the array.

Exposing with the FIG. 5 embodiment functions in a manner similar to the FIGS. 1–4 embodiment. However, in this embodiment it is desired for each pixel portion of the print medium to be addressed by exposing elements of each different light color, in the illustrated embodiment by R, G and B. Thus, the total scan sector dimension should be about equal to the product of the number of different colors being exposed (X, here 3) times the inter-element spacing (S, here 6). For the illustrated embodiment then, the image of the light valve array should be indexed to 18 different positions of approximately the green exposing width magnitude (W).

Data is formatted in computer buffers to be delivered to each light source pixel L in synchronization with the multiplexing of its image to a particular position on the print media line. As shown in FIG. 6 each pixel portion of a line can thus be addressed by light of each color without refeeding the media or changing filters. It will be noted in FIG. 6 that at the beginning and end portions of each line certain light pixels will be inactive during a portion of the line scan. This can be accomplished simply by disabling appropriate high voltage drivers or loading "0" bits into the appropriate data buffers prior to the line scan count reaching the START LINE position shown in FIG. 6.

In accord with the present invention, the light valve array of FIG. 5 is designed such that the half wave voltage is constant for all three colors. In accomplishing this construction, we have employed our observation that half-wave voltage of individual modulator portions of a light valve modulator panel is a function of what we term the "gap-electrode aspect ratio." This parameter of a modulator portion is a function of the gap width between address and reference electrodes and the combined width of those electrodes according to the following relation: aspect ratio = gap width g ÷ (one-half of the combined electrode width, 2We), or aspect ratio = g÷W. The approach taken to achieve the same half-wave voltage for all three light colors (red R, blue B, green G) is to vary that aspect ratio g/W while maintaining constant what we term the "effective electrode and gap width dimension" (2We/2+g), or g+We. The effective electrode and gap width dimension can best be visualized as the width between the centers of the reference and address electrodes and will comprise the gap width (g) and ½ the two combined widths We of the pair of electrodes bordering the gap.

Figure 7:
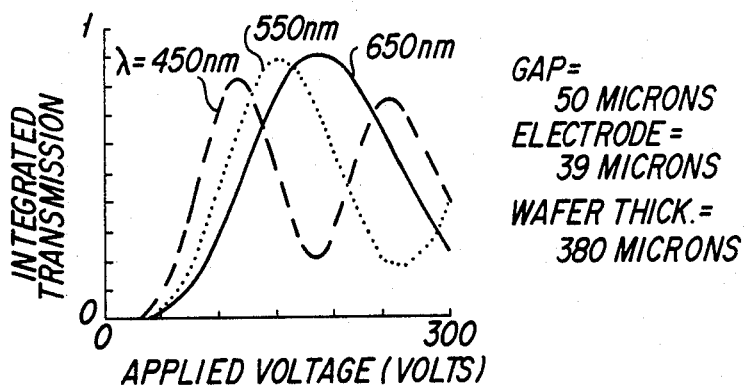
FIGS. 7 and 8 are graphs useful in explaining the mechanism of the present invention.

Construction of multicolor modulator arrays, having a common half-wave voltage, in accordance with the present invention can be effected in one preferred mode as follows. First, a desired "effective electrode and gap width dimension" (denoted E in FIG. 5b and equal to 2We/2+g, or E = We+g) is selected based on the imaging application in which the modulator is to be used. Next, applied voltage vs. light transmission curves are derived for each of the utilized light colors. FIG. 7 is an example of one such curve for a selected effective modulator width dimension of 89µ and g=50µ/W=39µ aspect ratio. Such curves can be derived by calculation or construction and measurement and are developed over a range of gap variations sufficient to plot curves such as shown in FIG. 8.

Figure 8:
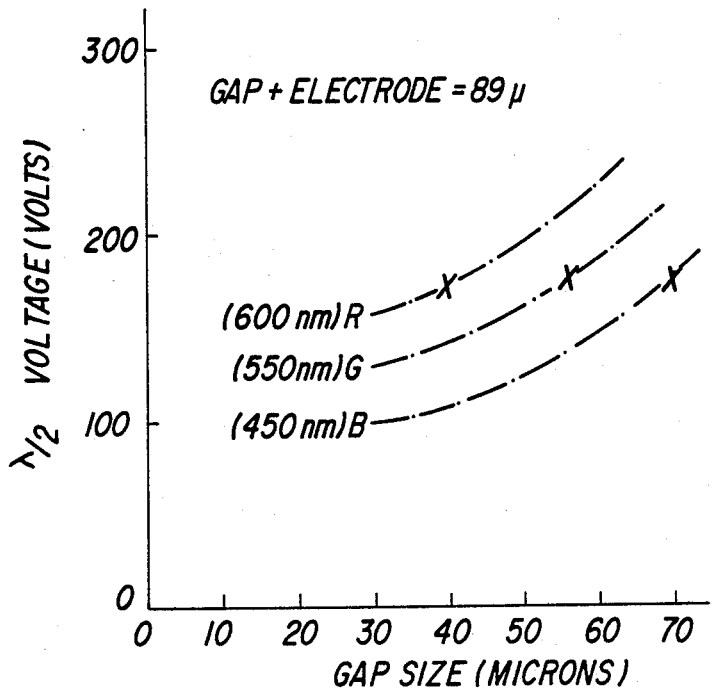

Referring to FIG. 8, it can be seen that the λ/2 voltage vs gap size curves, for red (600 nm), green (550 nm) and blue (450 nm) light transmission through light valve portions, each pass through a region of common λ/2 voltage levels, here in the region of 170 V. Thus, if it is desired to operate at a half-wave (λ/2) voltage of e.g. 170 V, the appropriate gap (g) selections would be about 40µ for the red light transmitting modulator, about 55µ for the green light transmitting modulator and about 68µ for the blue light transmitting modulator. The points are indicated by "X" marks on the FIG. 8 curves.

Accordingly, the light valve array for the aforedescribed example would have the following parameters:

| Color Transmitted | Elec. Gap (g) | Elec. Width (We) |
| --- | --- | --- |
| Red | 40μ | 49μ |
| Green | 55μ | 34μ |
| Blue | 68μ | 21μ |

The particular values for the FIG. 7 and 8 curves were calculated with a mathematical model for a periodic array of electrodes, formulated using conformal mapping and a set of transformations. The model resulted in a closed form solution for the electric field within the modulator. An experimentally derived expression relating birefringence to electric field for 9/65/35 PLZT was then used to calculate the retardation as a function of position in the gap. The resulting transmission vs voltage curves for the modulator were then calculated by averaging over the gap area.

A light valve array was constructed in accordance with the above-described design rules shown in FIG. 5. Although the measured half-wave voltages for such light valve are higher than the calculated values, maximum transmission at all three wavelengths occurred at approximately the same voltage level (200 volts). The discrepancy between actual and calculated half-wave voltages can be attributable to partial mechanical clamping which results when the devices are in a linear array geometry; whereas birefringence measurements used in the model were made on an unclamped modulator having a parallel plate electrode structure.

Thus when light valve devices are constructed using calculated unclamped modulators, the final array operating voltage should be determined by applying different voltage levels until maximum transmission is detected. As noted above, maximum transmission for each color will occur at substantially the same level, when aspect ratios have been designed according to the foregoing procedures.

The invention has been described in detail with particular reference to preferred embodiments thereof, but it will be understood that variations and modifications can be effected within the spirit and scope of the invention.

I claim:

1. In multicolor light valve imaging apparatus of the type including (i) an isotropic-birefringent modulator panel with sandwiching polarizer and analyzer elements, (ii) electrode means dividing said panel into an array comprising a plurality of selectively addressable pixel portions, (iii) a plurality of different color filter elements arranged in light filtering association with respective pixel portions, (iv) light source means for directing multicolor light through said modulator and polarizer, analyzer and filter elements and (v) means for addressing said electrodes to selectively apply voltage across said pixel portions, the improvement wherein:
    (a) said array comprises a plurality of predeterminedly different electrode constructions, respectively for each different color of filter elements, said electrode constructions differing so that the half-wave voltage for each pixel portion and filter combination is substantially equal and
    (b) said addressing means is constructed to apply such substantially equal half-wave voltage across all pixel portions of said panel.

2. The invention defined in claim 1 wherein said different electrode constructions comprise different gaps between electrodes, respectively for each of said different color of filter elements.

3. The invention defined in claim 2 wherein said different electrode constructions comprise different electrode widths, respectively for each of said different color of filter elements.

4. The invention defined in claim 3 wherein the dimensions, along the length direction of said array, between the centers of electrodes that define array pixel portions are substantially equal for each pixel portion of said array.

5. For use in a light valve imaging system to image print media with different light colors, a modulator device comprising:
    (a) a panel of electro-optic material of the type which changes the polarization of transmitted light selectively upon application of an electric field; and
    (b) a plurality of electrode pairs, linearly spaced along said panel to define an array of spaced pixel portions on said panel between respective electrode pairs, at least two of said pixel portions having a different gap dimension between their defining electrodes and having different widths of their defining electrodes respectively to effect maximum light transmission for different light colors when addressed by the same half-wave voltages.

6. The invention defined in claim 5 wherein the center-to-center spacing between array pixel portions is substantially equal.

* * * * *